(No Model.)
E. HERRINGTON.
SPRING MOTOR.
No. 494,203. Patented Mar. 28, 1893.
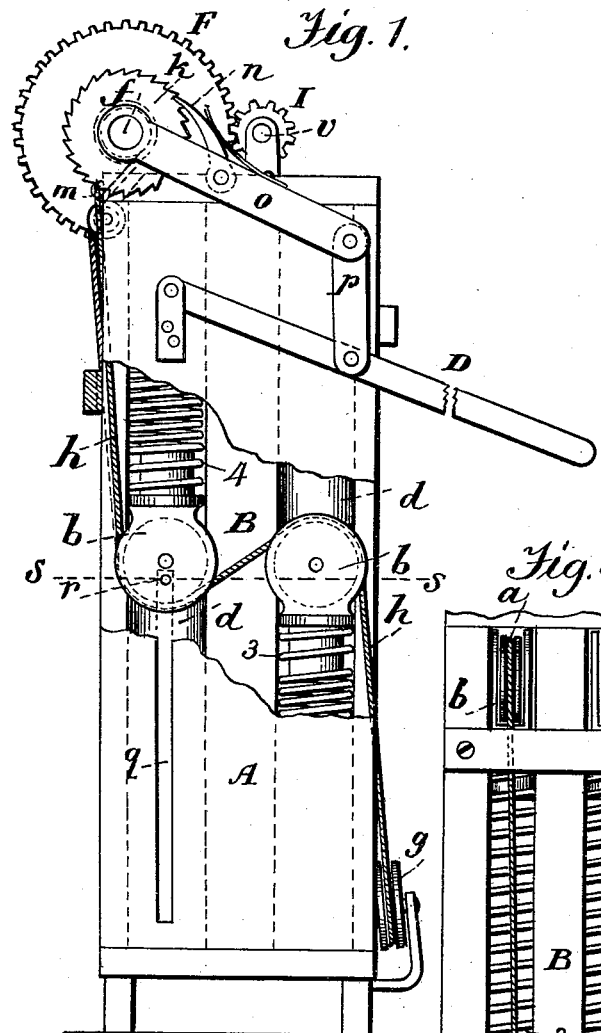
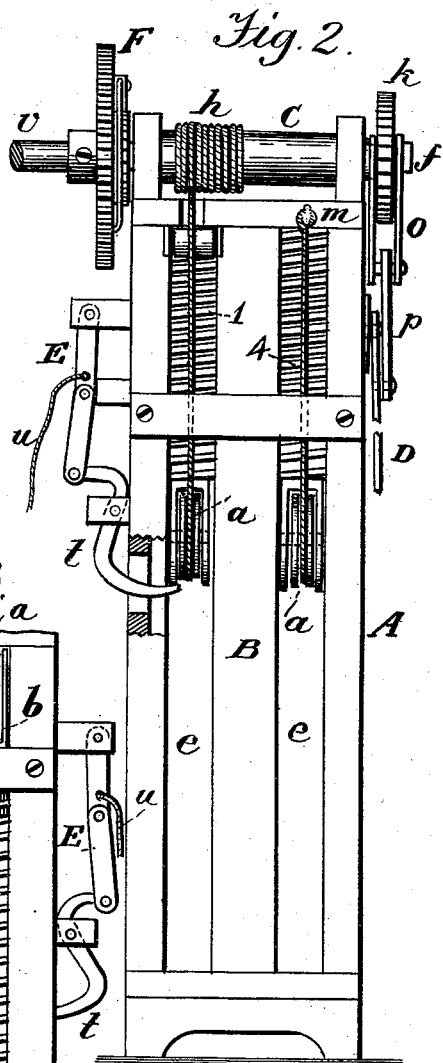
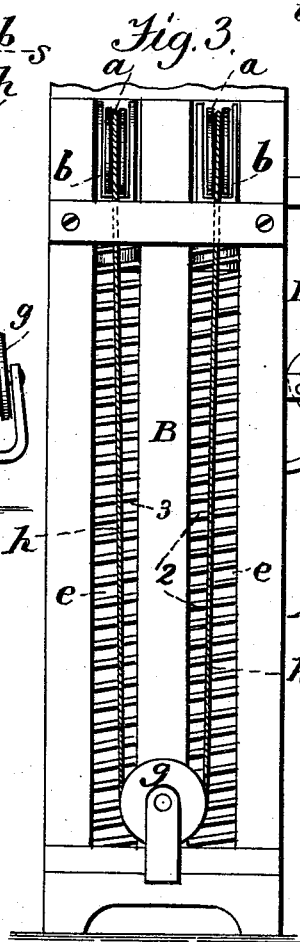
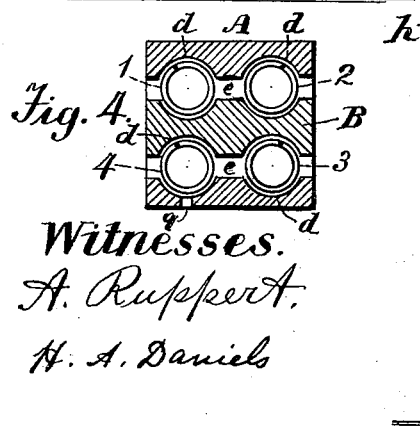
Witnesses.
A. Ruppert.
H. A. Daniels
Inventor:
Ephraim Herrington,
Per
Thomas P. Simpson
Atty

UNITED STATES PATENT OFFICE.

EPHRAIM HERRINGTON, OF ATLANTA, GEORGIA, ASSIGNOR OF ONE-HALF TO ROBERT P. HORTON, OF SAME PLACE.

SPRING-MOTOR.

SPECIFICATION forming part of Letters Patent No. 494,203, dated March 28, 1893.

Application filed November 16, 1892. Serial No. 452,125. (No model.)

*To all whom it may concern:*

Be it known that I, EPHRAIM HERRINGTON, a citizen of the United States of America, residing at Atlanta, in the county of Fulton and State of Georgia, have invented certain new and useful Improvements in Spring-Motors, of which the following is a specification, reference being had therein to the accompanying drawings.

This invention relates to spring power motors, and consists in an improved construction for such motors as hereinafter described and claimed.

In the accompanying drawings—Figure 1 represents a side view of a spring motor provided with my improvements, a part of the casing being broken away. Figs. 2 and 3 represent different sides of the device. Fig. 3 is a back view of the casing and springs. Fig. 4 is a horizontal section on dotted line S S of Fig. 1.

A designates the casing within which is placed a series of spiral springs, four springs being shown and designated respectively 1, 2, 3 and 4. Two of said springs bear at one end against the top and two against the bottom of the casing, the free end of each spring having attached to it a block $b$ in a bifurcation of which is mounted a pulley $a$.

The casing A is divided by a partition B, and has longitudinal recesses $d$ formed in its inner surfaces to retain the springs in position and form guides for the blocks $b$; also slots $e$, into which the edges of the bifurcated portions of the blocks may extend as seen in Fig. 1. On a shaft $f$, mounted in bearings at the top of the casing, is a drum C to which a cord $h$ is attached, and said cord is passed about the several pulleys $a$ successively and then fastened, so that by rotating the drum C and winding the said cord thereon, the several springs become compressed. As shown in the drawings, the cord $h$ is led from the drum C down to and about the pulley $a$ in the block connected with the spring 1; from thence to and about the pulley connected with the spring 2; from thence to and about a pulley $g$, mounted in bearings secured to the casing; from thence to and about a pulley connected with the spring 3, and from thence to and about the pulley connected with the spring 4, the end of the cord $h$ being made fast at $m$.

On one end of the shaft $f$ is a ratchet wheel $k$, and a spring pawl $n$, in position to connect with said wheel, is carried by a bar $o$, loosely connected at one end with said shaft, the opposite end being connected by a link $p$ with a pivoted hand lever D. By these devices the drum C may be rotated and the cord $h$ wound thereon until the several springs are sufficiently compressed.

In Fig. 1 is shown the position of springs when the apparatus is wound up. A rod $r$ extends from a sheave block $b$, connected with the spring 4, through a slot $q$ in the casing A, and a line is drawn at $s$ across the casing; the rod serving as an indicator when the apparatus is wound up.

E indicates toggle arms connected with one side of the casing and with a pivoted hook $t$ in position to connect with the sheave block of one of the pulleys $a$ as seen in Fig. 2, the parts being so constructed that by drawing a cord $u$ which is connected with the toggle arms, the hook $t$ may be withdrawn so that the springs are allowed to expand and the motor to operate, the operation continuing until all the springs are extended, as seen in Fig. 3.

F indicates a gear wheel on the shaft $f$ for imparting motion to a shaft $v$, through a pinion I on the last mentioned shaft, through which power may be transmitted to the mechanism of a sewing machine, or other machine for which the device may be used as a suitable motor.

The hook $t$ is usually located to connect with the block of the first pulley reached by the cord $h$ passing from the drum, so that all the springs, being compressed, are detained until the operator is ready to start. The springs employed may be increased in number as may be desired.

I claim—

In spring motors, the combination with a casing slotted and recessed as described, of a pulley $g$ in fixed bearings, movable blocks $b$ carrying the pulleys $a$, a series of spiral springs received into the recess of the casing, each spring bearing at one end against the casing and having attached to its other end one of the aforesaid movable blocks *b* a cord fast at one end to a rotary shaft, passing successively over all the pulleys and secured at the other end to the frame, an indicating rod *r* connected with a block *b*, and a pivoted hook *t* having toggle arms connected therewith, all substantially as shown and described.

In testimony whereof I affix my signature in presence of two witnesses.

EPHRAIM HERRINGTON.

Witnesses:
W. E. AUSTIN,
E. FISHER.